United States Patent
Gibson et al.

[11] Patent Number: 5,971,476
[45] Date of Patent: Oct. 26, 1999

[54] HANDLE ADJUSTMENT MECHANISM

[75] Inventors: William R. Gibson, Kent; Paul K. Meeker, Hiram, both of Ohio

[73] Assignee: Evenflo Company, Inc., Vandalia, Ohio

[21] Appl. No.: 09/177,176

[22] Filed: Oct. 22, 1998

[51] Int. Cl.$^6$ ..................................................... A47C 4/52
[52] U.S. Cl. .................................. 297/183.6; 297/183.4; 297/250.1
[58] Field of Search ............................. 297/183.1, 183.2, 297/250.1, 183.6, 183.4; 5/655; 224/158, 409

[56] References Cited

U.S. PATENT DOCUMENTS

| | | | |
|---|---|---|---|
| 4,634,177 | 1/1987 | Meeker | 297/183.2 X |
| 4,688,850 | 8/1987 | Brownlie et al. | 297/183.2 X |
| 5,409,292 | 4/1995 | Kain et al. | 297/183.1 |
| 5,516,190 | 5/1996 | Kain et al. | 297/183.6 |
| 5,658,044 | 8/1997 | Krevh | 297/183.1 X |

FOREIGN PATENT DOCUMENTS 9426152  11/1994  WIPO ................................ 297/250.1

Primary Examiner—Milton Nelson, Jr.
Attorney, Agent, or Firm—Thompson Hine & Flory LLP

[57] ABSTRACT

A handle adjustment mechanism for an infant car seat includes a pair of symmetrically similar, axially aligned, hollow first cylinders positioned on each side of an infant carrier and at respective handle arms. The first cylinders have a common axis coextensive with the axis of rotation and formed with a circumferential slot adjacent to the lower ends of the arms of the carrier. A pair of reduced second cylinders integrally formed on the infant carrier on the opposite sides thereof are located within the first cylinders. The second cylinders have a common central axis coincident with the axis of rotation for rotation movement of the first cylinder and arms therearound. The exterior surface of each second cylinder are formed with a plurality of radial recesses. A pair of releasable locking mechanisms are provided, each locking mechanism including a plate with a pivot pin rotatably securing the plate interior of an associated arm, a finger extending downwardly through the slot and positionable into a preselected recess in the second cylinder, and a spring having opposes surfaces in contact between a surface of the plate and an adjacent wall of an arm. Each of the plates has an exposed actuation surface, the depression of which will pivot the plate about its axis against the urging of the spring.

4 Claims, 4 Drawing Sheets

HANDLE ADJUSTMENT MECHANISM

BACKGROUND OF THE INVENTION

1. Field of the Invention

The present invention relates to a handle adjustment mechanism for an infant car seat and more particularly pertains to readily adjusting the handle orientation of an infant carrier in a safer, more convenient manner.

2. Description of the Prior Art

The use of child care products including infant carriers of known designs and configurations is known in the prior art. More specifically, infant carriers of known designs and configurations heretofore devised and utilized for the purpose of adjusting the handle orientation of child care products including infant carriers by known methods and apparatuses are known to consist basically of familiar, expected, and obvious structural configurations, notwithstanding the myriad of designs encompassed by the crowded prior art which has been developed for the fulfillment of countless objectives and requirements.

While known prior art devices fulfill their respective, particular objectives and requirements, the aforementioned patents do not describe handle adjustment mechanism for an infant car seat that allows readily adjusting the handle orientation of an infant carrier in a safer, more convenient manner.

In this respect, the handle adjustment mechanism for an infant car seat according to the present invention substantially departs from the conventional concepts and designs of the prior art, and in doing so provides an apparatus primarily developed for the purpose of readily adjusting the handle orientation of an infant carrier in a safer, more convenient manner.

Therefore, it can be appreciated that there exists a continuing need for a new and improved handle adjustment mechanism for an infant car seat which can be used for readily adjusting the handle orientation of an infant carrier in a safer, more convenient manner. In this regard, the present invention substantially fulfills this need.

SUMMARY OF THE INVENTION

In view of the foregoing disadvantages inherent in the known types of infant carriers of known designs and configurations now present in the prior art, the present invention provides an improved handle adjustment mechanism for an infant car seat. As such, the general purpose of the present invention, which will be described subsequently in greater detail, is to provide a new and improved handle adjustment mechanism for an infant car seat and method which has all the advantages of the prior art and none of the disadvantages.

To attain this, the present invention essentially comprises a new and improved infant carrier system with a readily adjustable handle. The infant carrier system includes an essentially rigid shell. The shell has an upper surface adapted to receive a fabric padding with a child thereupon. The shell also has a lower surface positionable on a recipient area. A handle is provided having generally parallel arms with upper ends and a cross bar integrally formed thereacross for being grasped by an infant care provider. The arms also have lower ends pivotably coupled with respect to the shell at the sides thereof about an axis of rotation. A pair of symmetrically similar, axially aligned, hollow first cylinders are positioned on each side of the shell. The cylinders are integrally formed to the lower ends of the arms. The first cylinders have a common axis coextensive with the axis of rotation. The first cylinders are each formed with a small circumferential slot adjacent to the lower ends of the arms. A pair of reduced second cylinders are integrally formed on the shell on the opposite sides thereof located within the first cylinders. The second cylinders have a common central axis coincident with the axis of rotation for rotation movement of the first cylinder and arms therearound. The exterior surface of each second cylinder is formed with four radial recesses arranged as two pair. A pair of releasable coupling mechanisms operable with respect to the first and second cylinders function to lock the arms at any of a plurality of preselected locations. Each locking mechanism includes a generally triangular plate with a pivot pin rotatably securing the plate interior of an associated arm adjacent to the lower end thereof. Each plate has a finger extending downwardly through the slot and positionable into a preselected recess in the second cylinder. Each of the blocks has a compression coil spring. Each compression coil spring has an opposed surface in contact between a surface of the plate and an adjacent wall of an arm in proximity to the lower end thereof. Each of the plates has an exposed actuation surface. Depression of such surface will pivot the block about its axis against the urging of the spring to allow removal of the finger from a recess. In this manner the angular orientation of the arm with respect to the shell may be varied at the selection of a user.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved handle adjustment mechanism for an infant car seat which has all of the advantages of the prior art infant carriers of known designs and configurations and none of the disadvantages.

It is another object of the present invention to provide a new and improved handle adjustment mechanism for an infant car seat which may be easily and efficiently manufactured and marketed.

It is further object of the present invention to provide a new and improved handle adjustment mechanism for an infant car seat which is of durable and reliable constructions and which increases the convenience to a child care provider.

An even further object of the present invention is to provide a new and improved handle adjustment mechanism for an infant car seat which is susceptible of a low cost of manufacture with regard to both materials and labor, and which accordingly is then susceptible of low prices of sale to the consuming public, thereby making such handle adjustment mechanism for an infant car seat economically available to the buying public.

Even still another object of the present invention is to provide a for readily adjusting the handle orientation of an infant carrier in a safer, more convenient manner.

Lastly, it is an object of the present invention to provide a new and improved adjustable handle comprising a pair of symmetrically similar, axially aligned, hollow first cylinders. The cylinders are positioned on each side of an infant carrier and integrally formed to the lower ends of its arms. The first cylinders have a common axis coextensive with the axis of rotation, the first cylinders each being formed with a small circumferential slot adjacent to the lower ends of the arms of the carrier. A pair of reduced second cylinders are integrally formed on the infant carrier on the opposite sides thereof located within the first cylinders. The second cylinders have a common central axis coincident with the axis of rotation for rotation movement of the first cylinder and arms therearound. The exterior surface of each second cylinder is formed with a plurality of radial recesses. A pair of releasable coupling mechanisms operable with respect to the first and second cylinders function to lock the arms at any of a plurality of preselected locations. Each locking mechanism includes a plate with a pivot pin rotatably securing the plate interior of an associated arm adjacent to the lower end thereof. Each plate has a finger extending downwardly through the slot and positionable into a preselected recess in the second cylinder. Each of the blocks has a spring. Each spring is provided with opposed surfaces in contact between a surface of the plate and an adjacent wall of an arm in proximity to the lower end thereof. Each of the plates has an exposed actuation surface. Depression of such surface will pivot the block about its axis against the urging of the spring.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
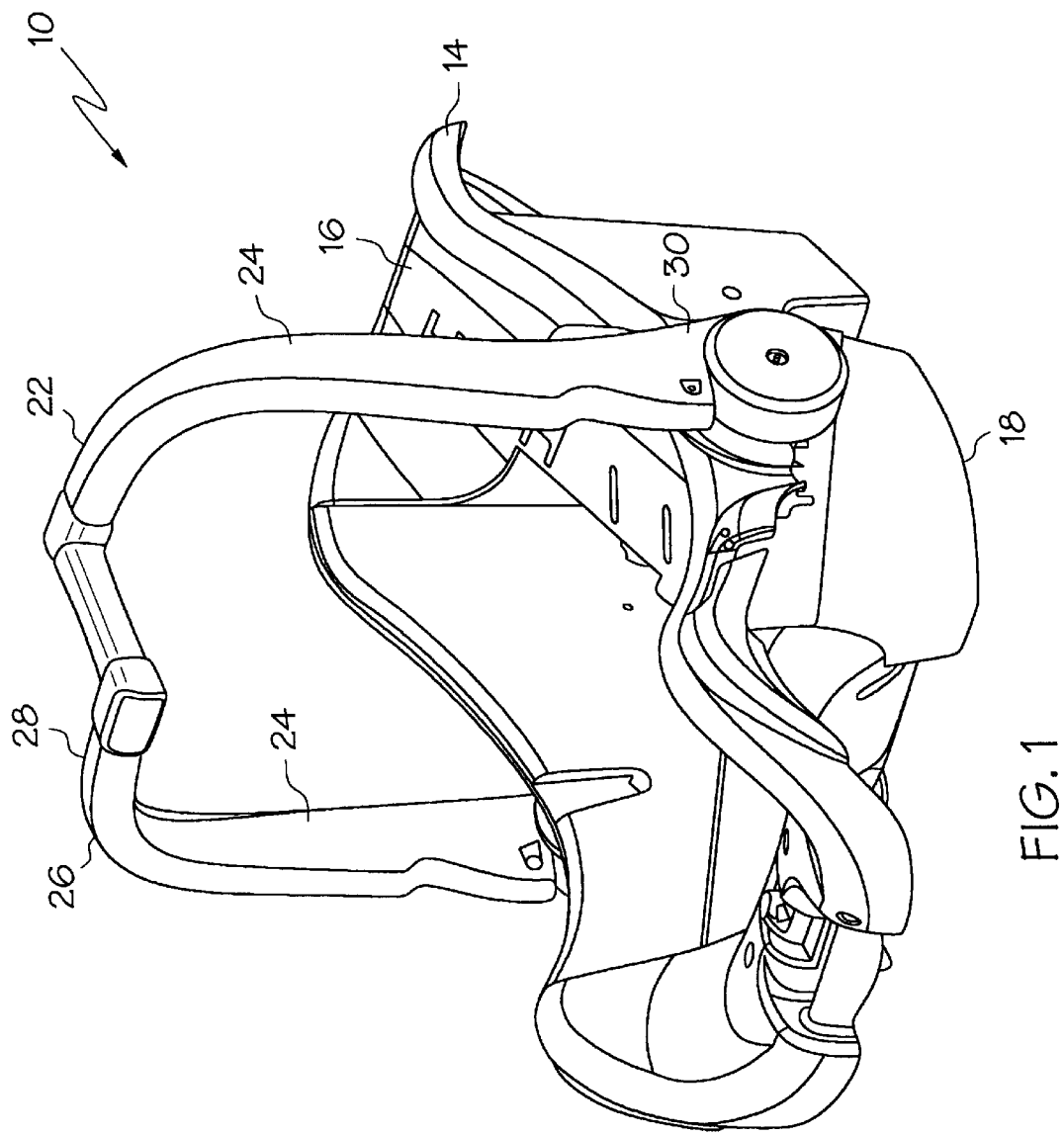
FIG. 1 is a perspective view of the new and improved infant carrier system constructed in accordance with the principles of the present invention.
Figure 2:
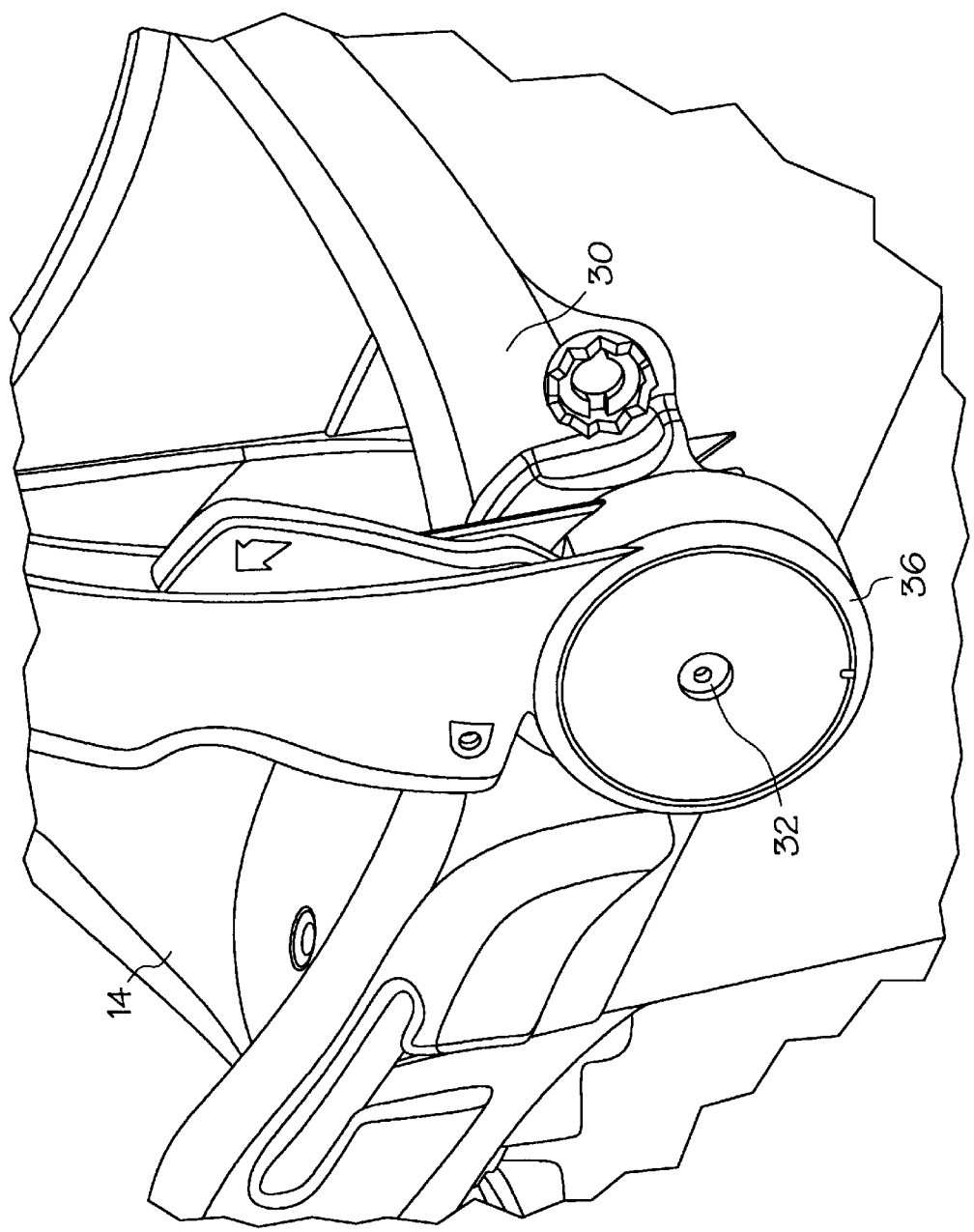
FIG. 2 is an enlarged perspective view of the adjustment mechanism of FIG. 1 taken from the opposite sides.
Figure 3:
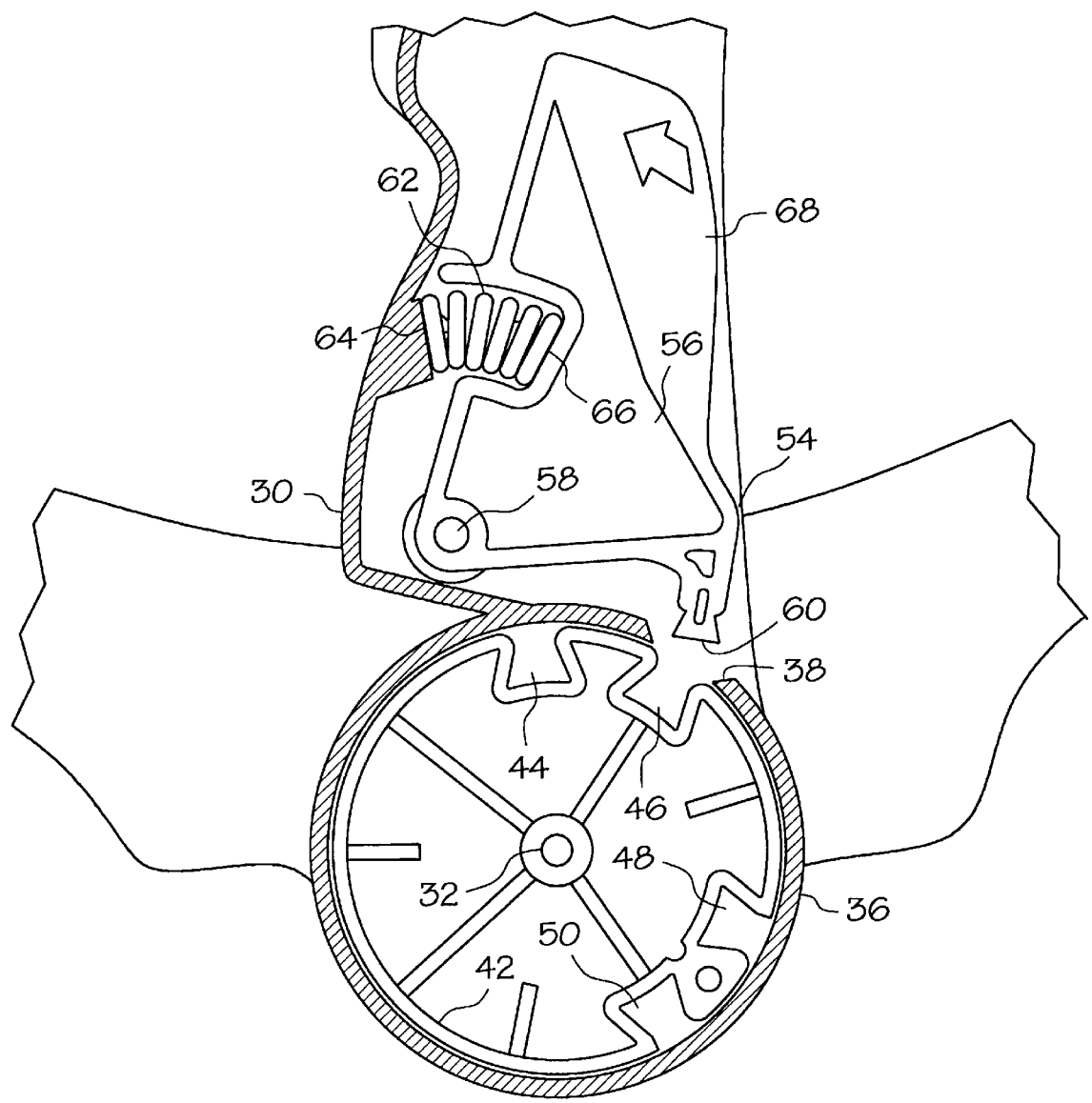
FIG. 3 is a cross-sectional view of the locking mechanisms in the released orientation.
Figure 4:
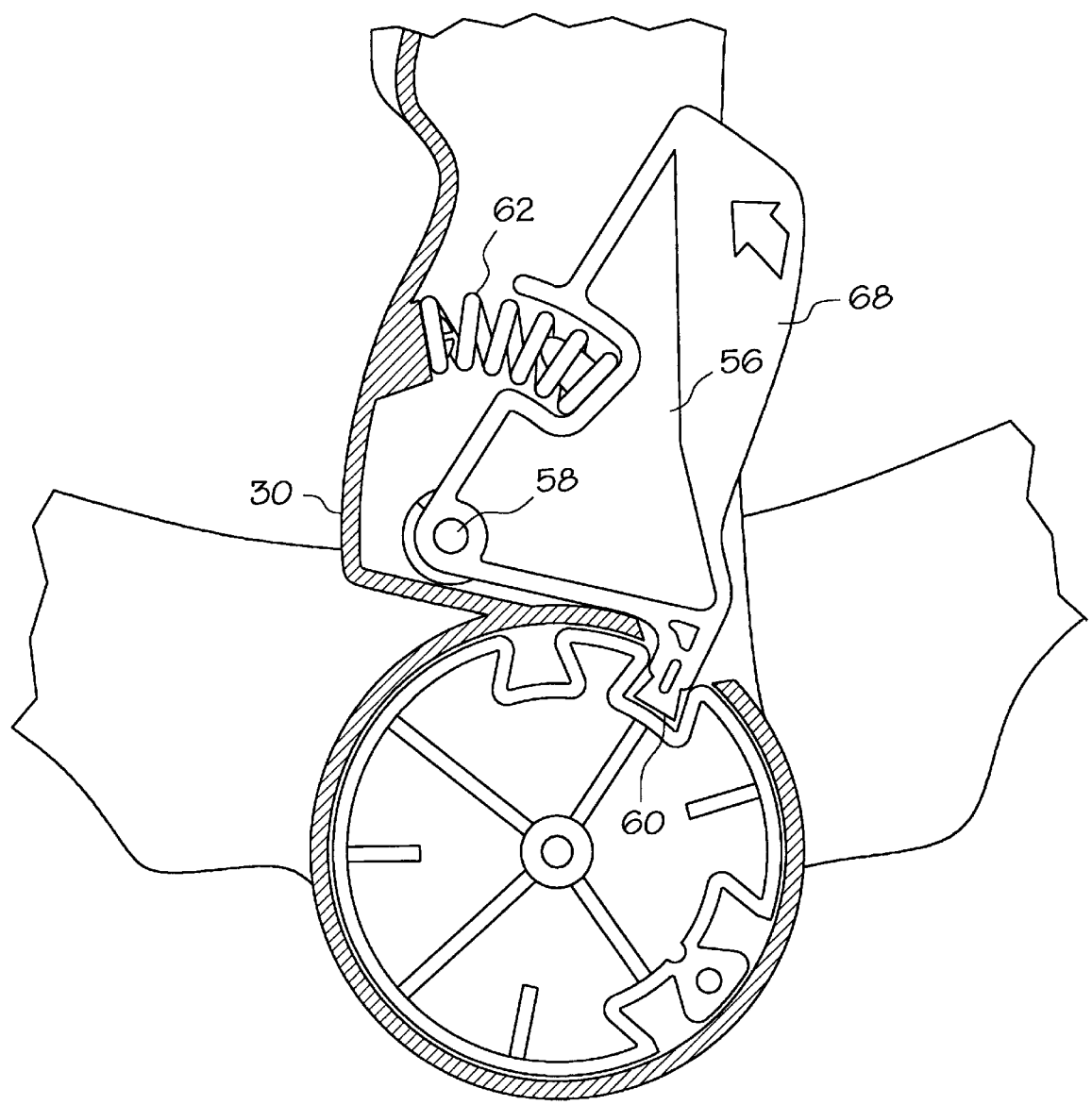
FIG. 4 is a cross-sectional view of the locking mechanisms in the locked orientation.

With reference now to the drawings, and in particular to FIG. 1 thereof, the preferred embodiment of the new and improved handle adjustment mechanism for an infant car seat embodying the principles and concepts of the present invention and generally designated by the reference numeral 10 will be described.

The present invention, the handle adjustment mechanism for an infant car seat 10 is comprised of a plurality of components. Such components in their broadest context include an essentially rigid shell; a handle; a pair of symmetrically similar, axially aligned, hollow first cylinders; a pair of reduced second cylinders; and a pair of releasable coupling mechanisms. Such components are individually configured and correlated with respect to each other so as to attain the desired objective.

A new and improved infant carrier system 10 with a readily adjustable handle comprises an essentially rigid shell 14. The shell has an upper surface 16 adapted to receive a fabric padding with a child thereupon. The shell has a lower surface 18 positionable on a recipient area.

A handle 22 is provided and has generally parallel arms 24. Integrally formed thereacross for being grasped by an infant care provider are upper ends 26 and a cross bar 28. The arms also have lower ends 30. The lower ends are pivotably coupled with respect to the shell at the sides thereof about an axis of rotation 32.

A pair of symmetrically similar, axially aligned, hollow first cylinders 36 are positioned on each side of the shell and integrally formed to the lower ends of the arms. The first cylinders having a common axis coextensive with the axis of rotation. The first cylinders are each formed with a small circumferential slot 38 adjacent to the lower ends of the arms.

A pair of reduced second cylinders 42 are integrally formed on the shell on the opposite sides thereof located within the first cylinders. The second cylinders have a common central axis coincident with the axis of rotation for rotation movement of the first cylinder and arms therearound. The exterior surface of each second cylinder is formed with four radial recesses 44, 46, 48, 50. The recesses are arranged as two pair 44, 46 and 48, 50.

A pair of releasable locking mechanisms 54 operable with respect to the first and second cylinders to lock the arms at any of a plurality of preselected locations. Each locking mechanism including a generally triangular plate 56. The triangular plate is provided with a pivot pin 58 rotatably securing the plate interior of an associated arm adjacent to the lower end thereof. Each plate has a finger 60 extending downwardly through the slot and positionable into a preselected recess in the second cylinder. Each of the blocks has a compression coil spring 62. Each compression coil spring is provided with an opposed surface 64, 66 in contact between a surface of the plate and an adjacent wall of an arm in proximity to the lower end thereof. Each of the plates has an exposed actuation surface 68. Depression of such surface will pivot the plate about its axis against the urging of the spring to allow removal of the finger from a recess. In this manner, angular orientation of the arm with respect to the shell may be varied at the selection of a user.

The invention is a means of adjusting the carrying handle of an infant car seat or carrier. The mechanism allows the user to rotate the handle up to a carrying position, down and out of the way for auto usage, or as a stand to support the carrier at an angle for feeding the child. At each position, the mechanism automatically locks the handle in place until released.

Most infant carrier handles function as described above, however, the act of adjusting them can be inconvenient and uncomfortable. To actuate the common mechanism, the user must depress a small button located on the front of each handle hub. The button is part of the latch mechanism located inside the hub. The hubs are circular protrusions located at the terminating ends of the handle, concentric to the pivot axis, at both sides of the car seat shell. The user must grip the hubs and press the buttons to release the mechanism. This can be difficult because the buttons are small and the springs that must be overcome are stiff. The handle must be rotated when the buttons are depressed and the mechanism disengaged, but the hubs provide the least amount of leverage for handle rotation.

The new latch mechanism is located above the hub, higher on the handle, where there is easier access and better leverage for handle rotation. The latch release surfaces are much larger than the former buttons and reside on the back of the handle. Opposite the release surface, the front of the handle is sculpted with hand-friendly contours-similar to that of a gun handle. The shape of the sculpted area is an obvious hand grip. When the user grips this area as they are facing the seat, fingers naturally wrap around the handle and align with the latch release lever. A squeeze of the whole hand, not just one or two fingers releases the latch mechanism.

This latch release surface is a portion of the latch part. A tooth is located at the opposite side of the part. A fastener attaches the latch to the handle and is also the axle around which the part pivots. A compression spring located inside the handle biases the latch tooth to engage any of a series of mating slots on the car seat shell spaced radially around the handle pivot axis. At rest, the latch tooth is always engaged to a slot on the shell, as long as the handle has been rotated to align the tooth to a slot. As hand pressure is applied to the latch release surface, the latch rotates, compressing the spring, and releasing the tooth from its slot. This done, with both latches the handle may be freely rotated to another position where the latch tooth can align with another slot.

This design is easier to use than other handle latch mechanisms. The latch release areas of the carry handle are sculpted for comfortable hand placement. The latch release surface is larger and allows more of the hand to apply the pressure required to easily unlatch the mechanism. The latch release location is above the handle hub where there is more leverage for easier handle rotation. Because the user is given more leverage to overcome the spring, this helps ensure positive engagement to the slots on the shell. As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the united states is as follows:

1. A new and improved infant carrier system with a readily adjustable handle comprising, in combination:

an essentially rigid shell having an upper surface adapted to receive a fabric padding with a child thereupon and also having a lower surface positionable on a recipient area;

a handle having generally parallel arms with upper ends and a cross bar integrally formed thereacross for being grasped by an infant care provider, the arms also having lower ends pivotably coupled with respect to the shell at the sides thereof about an axis of rotation;

a pair of symmetrically similar, axially aligned, hollow first cylinders positioned on each side of the shell and integrally formed to the lower ends of the arms, the first cylinders having a common axis coextensive with the axis of rotation, the first cylinders each being formed with a small circumferential slot adjacent to the lower ends of the arms;

a pair of reduced second cylinders integrally formed on the shell on the opposite sides thereof located within the first cylinders, the second cylinders having a common central axis coincident with the axis of rotation for rotation movement of the first cylinder and arms therearound, the exterior surface of each second cylinder being formed with four radial recesses arranged as two pair; and a pair of releasable mechanisms operable with respect to the first and second cylinders to lock the arms at any of a plurality of preselected locations, each locking mechanism including a generally triangular plate with a pivot pin rotatably securing the plate interior of an associated arm adjacent to the lower end thereof, each plate having a finger extending downwardly through the slot and positionable into a preselected recess in the second cylinder, each of the plates having a compression coil spring having an opposed surface in contact between a surface of the plate and an adjacent wall of an arm in proximity to the lower end thereof, each of the plates having an exposed actuation surface whereby depression of such surface will pivot the plate about its axis against the urging of the spring to allow removal of the finger from a recess whereby the angular orientation of the arm with respect to the shell may be varied at the selection of a user.

2. An adjustable handle comprising:

a pair of symmetrically similar, axially aligned, hollow first cylinders positioned on each side of an infant carrier and integrally formed to lower ends of a pair of arms, the first cylinders having a common axis coextensive with an axis of rotation, the first cylinders each being formed with a small circumferential slot adjacent to the lower ends of the arms of the carrier;

a pair of reduced second cylinders integrally formed on the infant carrier on the opposite sides thereof located within the first cylinders, the second cylinders having a common central axis coincident with the axis of rotation for rotation movement of the first cylinder and arms therearound, the exterior surface of each second cylinder being formed with a plurality of radial recesses; and a pair of releasable locking mechanisms operable with respect to the first and second cylinders to lock the arms at any of a plurality of preselected locations, each locking mechanism including a plate with a pivot pin rotatably securing the plate interior of an associated arm adjacent to the lower end thereof, each plate having a finger extending downwardly through the slot and positionable into a preselected recess in the second cylinder, each of the plates having a spring having opposed surfaces in contact between a surface of the plate and an adjacent wall of an arm in proximity to the lower end thereof, each of the plates having an exposed actuation surface whereby depression of such surface will pivot the plate about its axis against an urging of the spring.

3. The handle as set forth in claim 2 wherein the spring is a compression coil spring.

4. The handle as set forth in claim 2 wherein the plate is in a generally triangular configuration.

* * * * *